(12) United States Patent
Texier et al.

(10) Patent No.: US 12,375,555 B2
(45) Date of Patent: *Jul. 29, 2025

(54) SYSTEM AND METHOD FOR MULTI-STAGE GENERATION OF RESPONSES TO DATA REQUESTS

(71) Applicant: AMADEUS S.A.S., Biot (FR)

(72) Inventors: Rodolphe Texier, Vallauris (FR); Massimiliano Maini, Biot (FR); Delphine Dupont, Valbonne (FR)

(73) Assignee: AMADEUS S.A.S., Biot (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,315

(22) Filed: May 21, 2024

(65) Prior Publication Data

US 2024/0314198 A1    Sep. 19, 2024

Related U.S. Application Data

(63) Continuation of application No. 17/199,959, filed on Mar. 12, 2021, now Pat. No. 12,028,412, which is a continuation of application No. 16/691,987, filed on Nov. 22, 2019, now Pat. No. 10,979,494.

(51) Int. Cl.
*H04L 67/1008* (2022.01)
*H04L 67/1014* (2022.01)
*H04L 67/63* (2022.01)

(52) U.S. Cl.
CPC ...... *H04L 67/1008* (2013.01); *H04L 67/1014* (2013.01); *H04L 67/63* (2022.05)

(58) Field of Classification Search
CPC . H04L 67/1014; H04L 67/63; H04L 67/1008; H04L 67/01
See application file for complete search history.

(56) References Cited

U.S. PATENT DOCUMENTS

| 10,979,494 B1* | 4/2021 | Texier ............ H04L 67/1014 |
| 2007/0192706 A1 | 8/2007 | Bruce et al. |
| 2008/0256036 A1 | 10/2008 | Falk et al. |
| 2011/0282701 A1 | 11/2011 | Reiz |
| 2013/0332284 A1 | 12/2013 | Faith et al. |
| 2016/0164977 A1 | 6/2016 | Salonen |
| 2016/0255139 A1 | 9/2016 | Rathod |

(Continued)

FOREIGN PATENT DOCUMENTS

| WO | WO-2016133516 A1 | 8/2016 |
| WO | WO-2019018873 A1 | 1/2019 |

*Primary Examiner* — Kristie D Shingles
(74) *Attorney, Agent, or Firm* — Perry + Currier Inc.

(57) ABSTRACT

A method includes: receiving, at an intermediation server from a client subsystem, a data request including a set of request parameters; transmitting the set of request parameters from the intermediation server to a plurality of provider subsystems; receiving, at the intermediation server, respective initial responses each containing sets of initial response data corresponding to the request parameters; sending, from the intermediation server to at least one of the provider subsystems, a secondary request for updated response data, the secondary request including an indication of at least one set of initial response data; receiving, in response to the secondary request, the updated response data; and transmitting the updated response data to the client subsystem.

20 Claims, 8 Drawing Sheets

(56) References Cited

U.S. PATENT DOCUMENTS

| | | |
|---|---|---|
| 2016/0307118 A1 | 10/2016 | De Carvajal Aguilar et al. |
| 2016/0378874 A1 | 12/2016 | Jafri |
| 2017/0316523 A1 | 11/2017 | Jafri |
| 2019/0044829 A1 | 2/2019 | Balzer et al. |
| 2019/0082029 A1 | 3/2019 | Lipstone et al. |
| 2019/0378058 A1 | 12/2019 | Jafri |
| 2021/0019844 A1 | 1/2021 | Prezet et al. |

* cited by examiner

SYSTEM AND METHOD FOR MULTI-STAGE GENERATION OF RESPONSES TO DATA REQUESTS

CROSS-REFERENCE TO RELATED APPLICATIONS

This application is a continuation of U.S. patent application Ser. No. 17/199,959, filed Mar. 12, 2021, which is a continuation of U.S. patent application Ser. No. 16/691,987, filed Nov. 22, 2019. The contents of the above documents is incorporated herein by reference.

FIELD

The specification relates generally to handling data requests in computing systems, and specifically to a system and method for multi-stage generation of responses to data requests.

BACKGROUND

Certain requests within computing systems are responded to with generated or computed data, as opposed to existing data that need only be retrieved from storage. The generation of such responses can be dependent on a significant number of variables from diverse sources of input data. Obtaining the above-mentioned inputs can introduce delay to the generation of responses, for example by imposing additional computation load on the system and/or by generating excessive network traffic.

SUMMARY

An aspect of the specification provides a method, comprising: receiving, at an intermediation server from a client subsystem, a data request including a set of request parameters; transmitting the set of request parameters from the intermediation server to a plurality of provider subsystems; receiving, at the intermediation server, respective initial responses each containing sets of initial response data corresponding to the request parameters; sending, from the intermediation server to at least one of the provider subsystems, a secondary request for updated response data, the secondary request including an indication of at least one set of initial response data; receiving, in response to the secondary request, the updated response data; and transmitting the updated response data to the client subsystem.

Another aspect of the specification provides an intermediation server, comprising: a communications interface; and a processor connected with the communications interface, the processor configured to: receive, from a client subsystem via the communications interface, a data request including a set of request parameters; transmit the set of request parameters to a plurality of provider subsystems; receive respective initial responses each containing sets of initial response data corresponding to the request parameters; send, to at least one of the provider subsystems, a secondary request for updated response data, the secondary request including an indication of at least one set of initial response data; receive, in response to the secondary request, the updated response data; and transmit the updated response data to the client subsystem.

A further aspect of the specification provides a non-transitory computer-readable medium storing computer-readable instructions executable by a processor of an intermediation server to cause the intermediation server to: receive, from a client subsystem via a communications interface of the intermediation server, a data re-quest including a set of request parameters; transmit the set of request parameters to a plurality of provider subsystems; receive respective initial responses each containing sets of initial response data corresponding to the request parameters; send, to at least one of the provider subsystems, a secondary request for updated response data, the secondary request including an indication of at least one set of initial response data; receive, in response to the secondary request, the updated response data; and transmit the updated response data to the client subsystem.

BRIEF DESCRIPTIONS OF THE DRAWINGS

Embodiments are described with reference to the following figures, in which.

DETAILED DESCRIPTION

Figure 1:
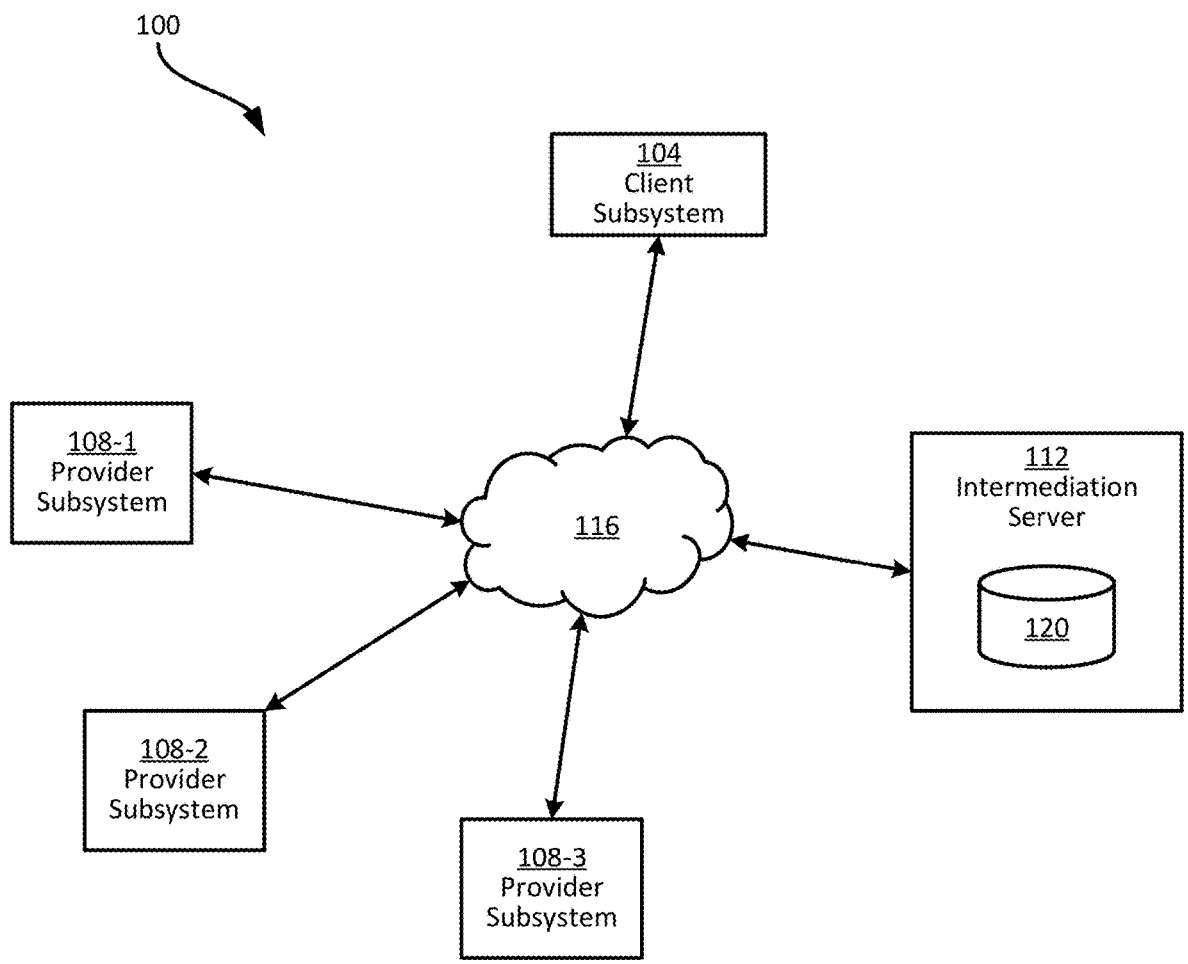
FIG. 1 depicts a system for request handling.

FIG. 1 depicts a system 100 for handling data requests. In general, handling data requests in this context refers to the receipt of a request, and the processing of that request, e.g. by consulting one or more other sources of data to generate a response that is then provided to the computing device that originated the request.

In the examples discussed below, the data requests originate at a client subsystem 104, which may be any suitable one of, or any suitable combination of, computing devices including a desktop computer, a mobile computer such as a tablet, and the like. A single client subsystem 104 is shown, but the system 100 can include any number of client subsystems 104. The requests originated at the client subsystem 104, in the examples discussed below, are requests for information describing travel-related products and services, such as flights, hotel reservations, vehicle rentals, and the like (generally referred to as items).

The client subsystem 104 can be operated by a direct consumer of the above-mentioned items (e.g. an individual traveler). In other examples, the client subsystem 104 can be operated by an intermediate entity such as a travel agency, which may obtain the above-mentioned items on behalf of individual travelers. Such an intermediate entity may also be referred to as a seller (i.e. an entity that sells the items to the traveler or other endpoint consumer).

The requests originated by the client subsystem 104 include various options and attributes, which may also be referred to as request parameters, defining desired characteristics of the items to be returned to the client subsystem 104. Examples of such options and attributes include times and dates, origin and destination locations, and the like. The response(s) to such requests received at the client subsystem 104 include data defining items that satisfy at least some of the above-mentioned options and attributes. The responses are generated by, or on behalf of, entities that provide the items. That is, the providers are entities such as airlines, hotel operators or the like that deliver the items to the endpoint consumer following purchase of the items (e.g. via the client subsystem 104). In the present example, the provider entities also generate the above-mentioned responses to requests from the client subsystem 104. To that end, each provider entity operates a provider subsystem, of which three examples 108-1, 108-2 and 108-3 are shown in FIG. 1 (collectively referred to as provider subsystems 108 and generically referred to as a provider subsystem 108). The system 100 can include a greater or smaller number of provider subsystems 108 in other examples.

Each provider subsystem 108 receives requests from the client subsystem 104, although different requests may be delivered to different subsets of the provider subsystems 108. In response to any given request received at a provider subsystem 108, the provider subsystem 108 generates response data to return to the client subsystem 104. In general, generation of response data by a provider subsystem 108 involves selecting, among the set of items (e.g. flights) provided by the entity operating that provider subsystem 108, one or more items having characteristics that match at least some of the options and attributes in the request. Because of the variety of possible attributes and options in data requests and the corresponding variety of item characteristics, generation of response data by a provider subsystem 108 can be computationally costly, requiring retrieval of data from multiple sources within and/or external to the provider subsystem 108 and evaluation of a plurality of rules or other mechanisms.

Among the information a given provider subsystem 108 may consume to generate a response to a data request from the client subsystem 104, in addition to the above-mentioned request attributes and options, are responses to the same request generated by other provider subsystems 108. The other responses are generated substantially simultaneously with response generation at the given provider subsystem 108. Obtaining such other responses, however, may delay the generation of the response at the given provider subsystem 108, and may also impose further computational and/or network traffic load on the provider subsystems 108.

The system 100 therefore also includes an intermediation server 112 connected with the client subsystem 104 and the provider subsystems 108 via a network 116 (e.g. any suitable combination of local-area and wide-area networks, including the Internet). The intermediation server 112, also referred to herein simply as the server 112, intermediates between the client subsystem 104 and the provider subsystems 108. That is, the intermediation server 112 receives requests from the client subsystem 112 and passes such requests to at least a subset of the provider subsystems 108 for response generation. The server 112 also receives responses generated by the provider subsystems 108 for delivery to the client subsystem 104. In addition, as will be discussed in greater detail below, the server 112 can implement a multi-stage response generation process that enables the provider subsystems 108 to generate responses based not only on the request itself, but also on responses generated by other provider subsystems 108, while mitigating the impact of such multi-stage generation on the provider subsystems 108. The server 112 stores a provider profile repository 120 (which may also be referred to as a subscriber repository) containing configuration data to be employed in the above-mentioned multi-stage response generation process.

Before further discussion of the functionality of the various components of the system 100, certain internal components of the intermediation server 112 will be described in connection with FIG. 2.

Figure 2:
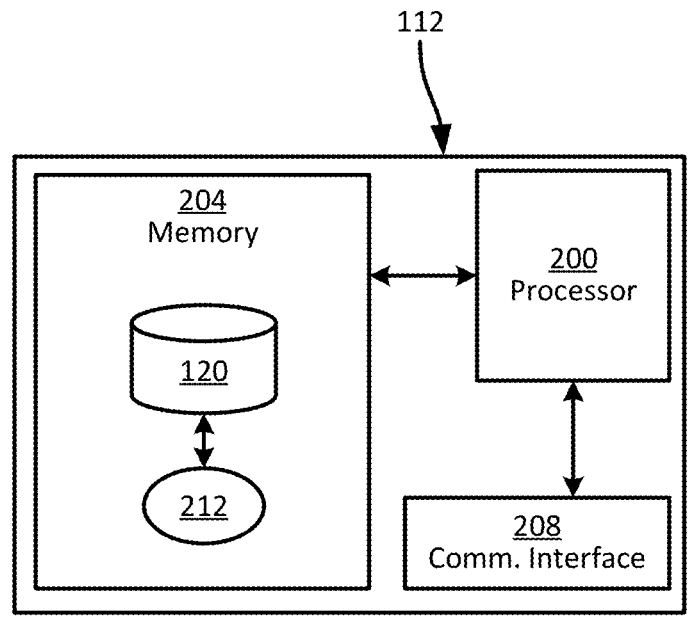
FIG. 2 depicts certain components of the intermediation server of FIG. 1.

Turning to FIG. 2, the intermediation server 112 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 112 to communicate with the other computing devices of the system 100 via the network 116. The communication interface 208 therefore includes any necessary components (e.g. network interface controllers (NICs), radio units, and the like) to communicate via the network 116. The specific components of the communication interface 208 are selected based on the nature of the network 116. The server 112 can also include input and output devices connected to the processor 200, such as keyboards, mice, displays, and the like (not shown).

The components of the server 112 mentioned above can be deployed in a single enclosure, or in a distributed format. In some examples, therefore, the server 112 includes a plurality of processors, either sharing the memory 204 and communication interface 208, or each having distinct associated memories and communication interfaces.

The memory 204 stores the profile repository 120 mentioned above, as well as computer-readable instructions executable by the processor 200 to implement various functionality. The computer-readable instructions may also be referred to as applications, and in the illustrated example the memory 204 stores a request handling application 212 (also referred to herein simply as the application 212). The processor 200 executes the instructions of the application 212 in order to perform various actions defined by the instructions contained therein. In the description below, the processor 200, and more generally the server 112, are said to perform, or to be configured to perform, those actions. It will be understood that they are so configured via the execution (by the processor 200) of the instructions of the applications stored in memory 204. In general, the server 112 is configured, via execution of the application 212, to implement the above-mentioned multi-stage response generation process to enable the provider subsystems 108 to use responses (to a common request from the client subsystem 104) from other provider subsystems 108 in order to generate a response.

Figure 3:
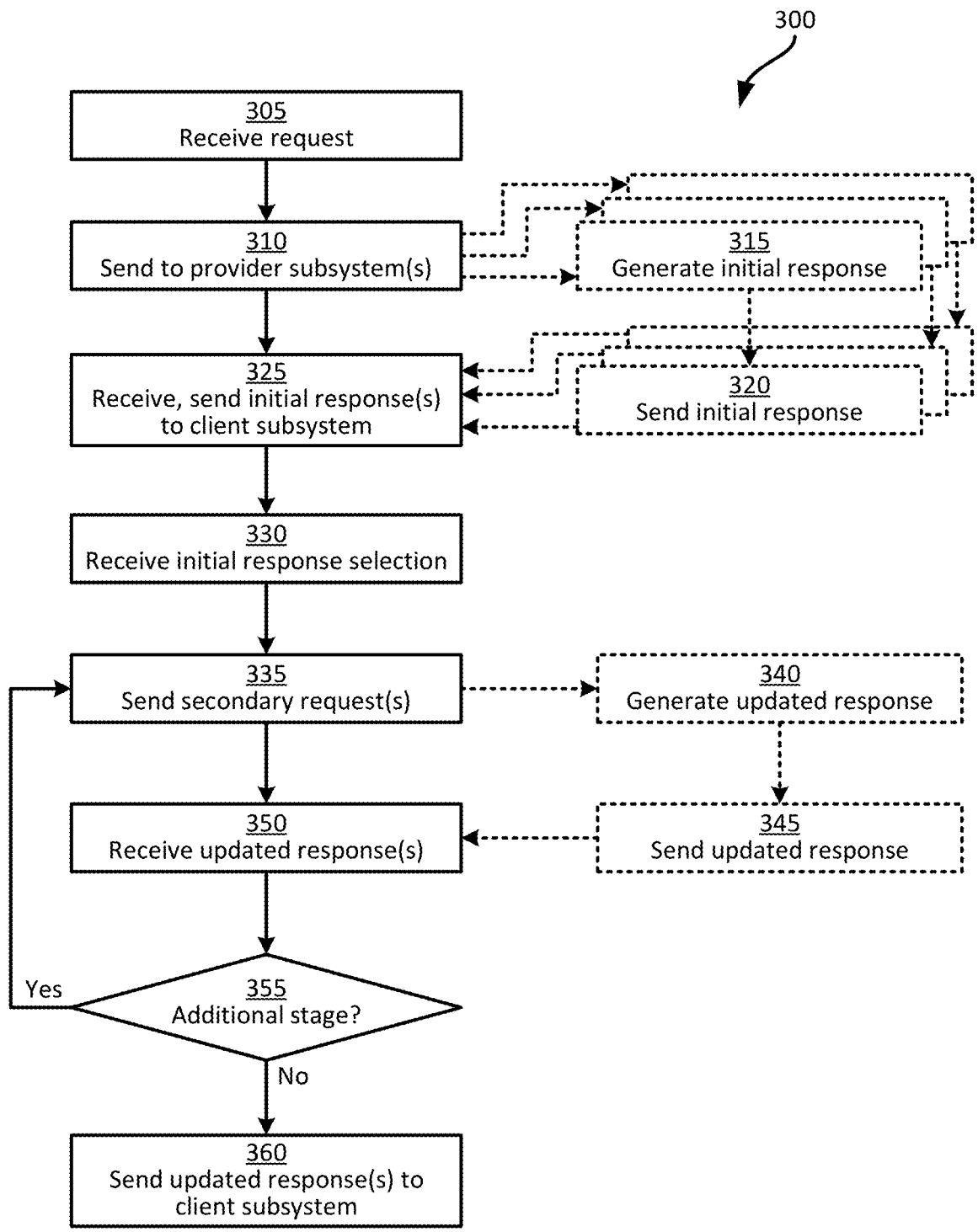
FIG. 3 depicts a method of multi-stage generation of responses to data requests.

Turning now to FIG. 3, certain aspects of the operation of the system 100 will be described in greater detail. Specifically, FIG. 3 illustrates a method 300 of multi-stage generation of responses to data requests. The performance of the method 300 will be described below in conjunction with its performance within the system 100. In particular, the blocks illustrated in solid lines are performed by the intermediation server 112, and the blocks illustrated in dashed lines are performed by the provider subsystems 108. That is, multiple instances of each block shown in dashed lines can be performed, with each instance being performed by one of the provider subsystems 108.

Figure 4:
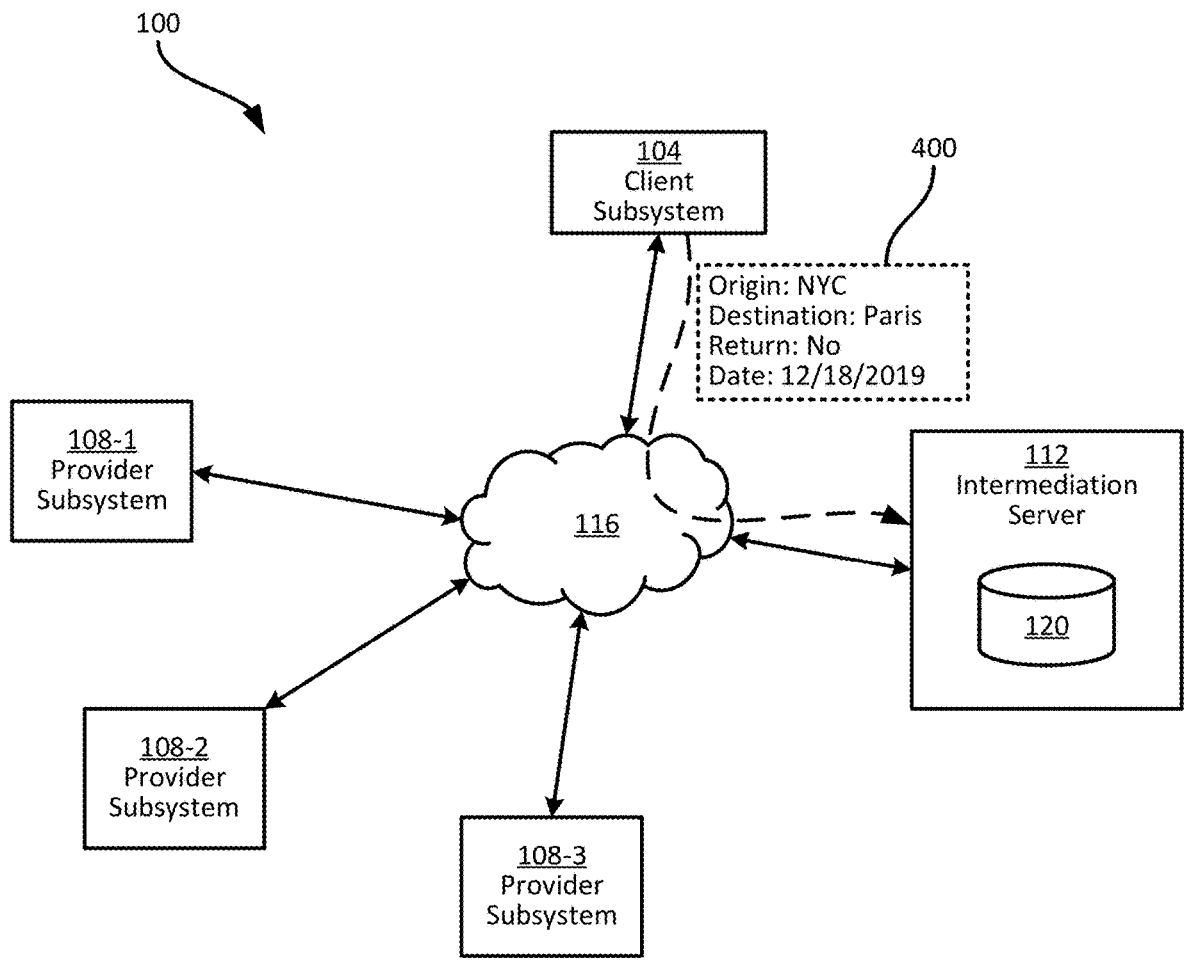
FIG. 4 illustrates an example performance of block 305 of the method of FIG. 3.

At block 305, the server 112 receives a request from the client subsystem 104 via the network 116. The request can be transmitted to the server 112 via any suitable interface (e.g. an API exposed by the server 112 or the like). The request includes request attributes and/or options that, as mentioned earlier, define desired characteristics of items such as flights, hotel rooms and the like, to be returned to the client subsystem 104. Turning briefly to FIG. 4, an example request 400 is shown being transmitted from the client subsystem 104 to the server 112. The request 400, which may be referred to as a shopping request, includes origin, destination, and date attributes for flights, as well as an indication that a return flight is not requested (i.e. the request 400 is for one-way flights). Specifically, in the illustrated example, the request 400 indicates that the client subsystem 104 is searching for a one-way (i.e. non-return) flight from New York City to Paris on Dec. 18, 2019. The request 400 can include a variety of other request parameters, for example defining ancillary services such as a baggage check service.

Returning to FIG. 3, at block 310, having received the request 400, the server 112 sends the set of request parameters from the request 400 to at least one of the provider subsystems 108. In the present example, the server 112 is assumed to send the request parameters to each of the provider subsystems 108, to solicit offers of items from each provider subsystem 108 to return to the client subsystem 104.

At separate instances of block 315, each provider subsystem 108 receives the request parameters, and generates initial response data. The initial response data generated by each provider subsystem 108 defines one or more items from the inventory of that provider subsystem 108 that satisfy at least some of the request parameters. The provider subsystems 108 can employ any of a wide variety of mechanisms to generate the response data. Such mechanisms are not directly relevant to the handling of requests and response by the server 112, and are therefore not discussed in greater detail herein.

Having generated initial response data, at separate instances of block 320, each provider subsystem 108 transmits an initial response to the server 112 containing the initial response data generated by that provider subsystem 108. The instances of block 320 (as well as the instances of block 315 mentioned above) are substantially simultaneous, in that they occur within a common time frame. For example, the instances of block 320 can occur within the same time period (e.g. 5-15 seconds, although shorter or longer time periods are also contemplated), although within that time period the performance of block 320 at the provider subsystem 108-1 may be complete before the performance of block 320 at the provider subsystem 108-2.

At block 325, the server 112 receives the initial responses from the provider subsystems 108 and sends at least a portion of the initial response data from those responses to the client subsystem 104. The server 112 can wait until an initial response is received at block 325 for each request sent at block 310, before sending the initial response data to the client subsystem 104. In other examples, the server 112 can send initial response data upon receipt, in which case multiple instances of block 325 may be performed, e.g. one for each initial response received from a provider subsystem 108.

Figure 5:
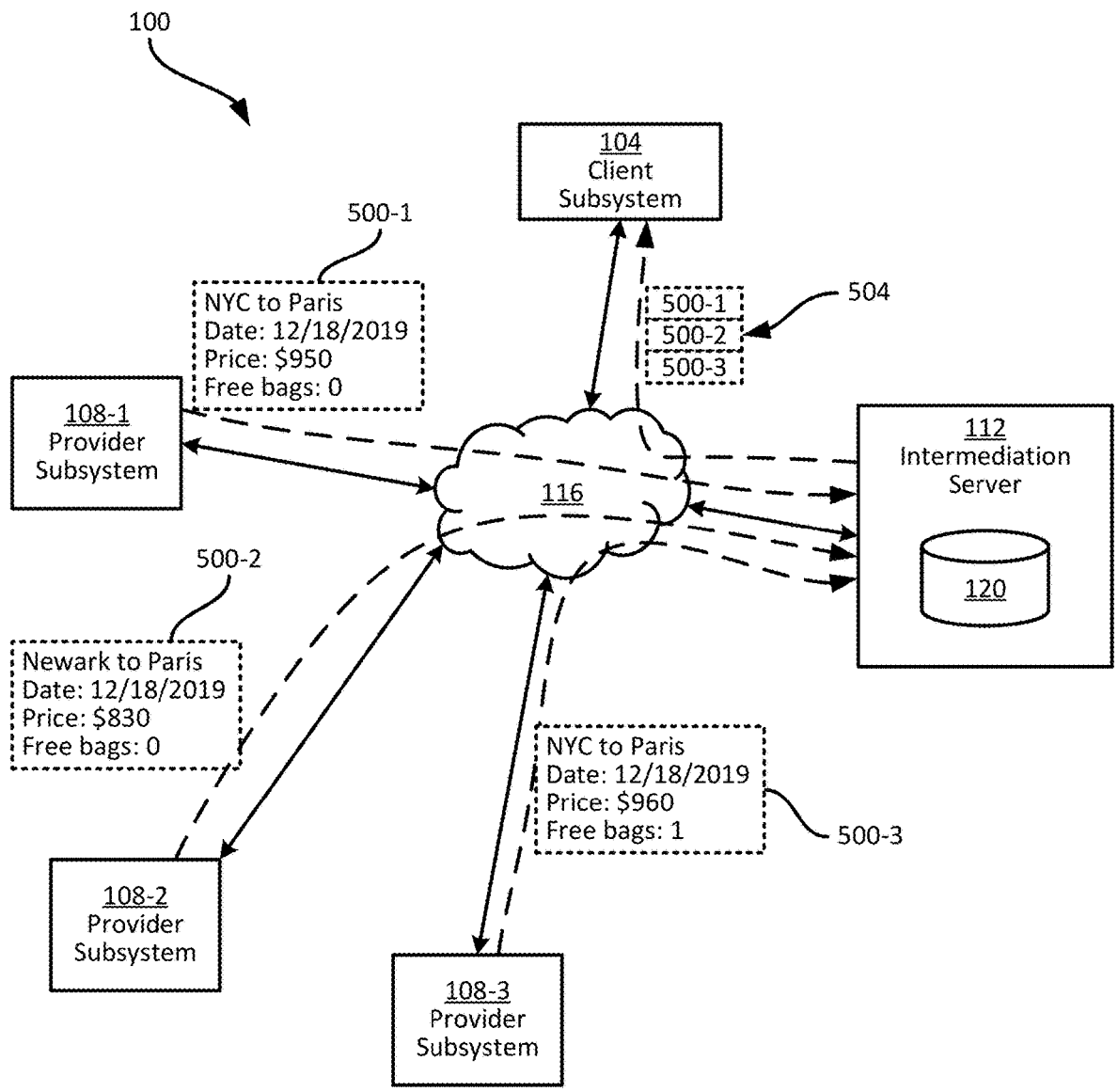
FIG. 5 illustrates an example performance of blocks 320 and 325 of the method of FIG. 3.

Referring to FIG. 5, an example performance of block 320 and 325 is illustrated. In particular, each provider subsystem 108 has generated and sent, to the server 112, an initial response 500 containing initial response data. The initial response data defines at least one item with characteristics corresponding to the request parameters in the request received at block 305.

As mentioned earlier, the request 400 indicated that the client subsystem 104 sought one-way flights from New York to Paris on Dec. 18, 2019. In the example illustrated in FIG. 5, the initial response 500-1 from the provider subsystem 108-1 contains initial response data defining a flight from New York to Paris on Dec. 18, 2019 with a cost of $950 and with no free baggage check. The initial response 500-2 from the provider subsystem 108-2 contains initial response data defining a flight from Newark, rather than from New York City itself, to Paris on Dec. 18, 2019 with a cost of $830 and with no free baggage check. Finally, the initial response 500-3 from the provider subsystem 108-3 contains initial response data defining a flight from New York to Paris on Dec. 18, 2019 with a cost of $960 and with free baggage check for one bag.

The initial responses 500-1 are received at the server 112, where they may be stored, as well as forwarded to the client subsystem 104. In particular, a message 504 is shown transmitted from the server 112 to the client subsystem 104, containing each of the initial responses 500. The initial responses can have response identifiers (which may also be referred to as offer identifiers), assigned by either or both of the provider subsystems 108 and the server 112. The reference numbers 500-1, 500-2 and 500-3 are assumed to be response identifiers in the illustrated example, and are also passed to the client subsystem 104 at block 325, permitting subsequent processing of the response data to be associated with the initial responses 500.

The client subsystem 104, upon receipt of the message 504 containing the initial response data, can present the initial response data on a display and/or other suitable output assembly. The client subsystem 104 can then receive a selection of one of the initial responses 500 for further processing (e.g. for booking, in the case of travel-related items). It will be understood, however, that a selection may not occur following the transmission of initial responses to the client subsystem 104 at block 325. For example, if no selection is received from the client subsystem 104 within a configurable time period (e.g. 10 minutes), the server 112 can discard the initial responses 500 and terminate performance of the method 300.

Figure 6:
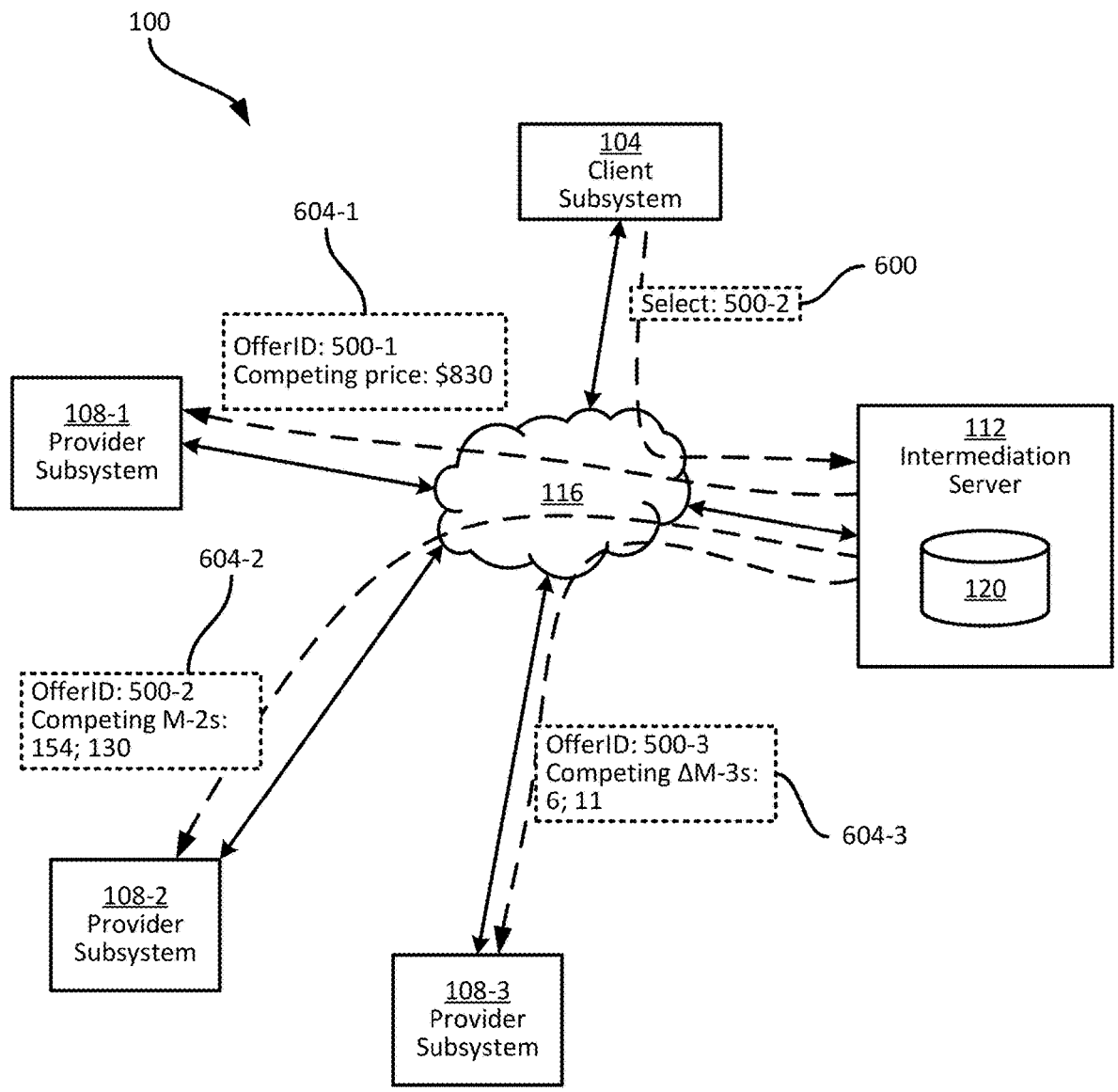
FIG. 6 illustrates an example performance of blocks 330 and 335 of the method of FIG. 3.

In the present example performance of the method 300, it is assumed that the client subsystem 104 does receive a selection of an initial response 500, and therefore at block 330 the server 112 receives that selection from the client subsystem 104. The selection can include, for example the response identifier mentioned above. Referring briefly to FIG. 6, a selection 600 containing the response identifier 500-2 is shown being transmitted from the client subsystem 104 to the server 112, indicating that the initial response 500-2 (i.e. the flight from Newark to Paris) has been selected at the client subsystem 104.

Returning again to FIG. 3, in response to receiving the selection at block 330, at block 335 the server 112 sends a secondary request to at least one of the provider subsystems 104. As will be discussed below, the secondary requests are invitations to the provider subsystems 108 to update the initial response data (i.e. to produce updated responses to the initial request received at block 305), informed by the initial responses of other provider subsystems 108.

Which provider subsystems 108 receive secondary requests, as well as the content of the secondary requests, can be defined in the profile repository 120. The repository 120 can, for example, contain a record corresponding to each provider subsystem 108 indicating whether the provider subsystem 108 is to receive secondary requests. An example repository 120 is shown below in Table 1.

TABLE 1

Profile Repository 120

| Provider ID | Subscriber? | Contents of Secondary Request |
|---|---|---|
| 108-1 | Yes | Price of cheapest competing offer |
| 108-2 | Yes | Metric M-2 for each competing offer |
| 108-3 | Yes | Metric M-3 delta for each competing offer |

As seen above, each of the provider subsystems 108 is indicated as being a subscriber to the multi-stage response generation process, and each provider subsystem 108 will therefore be sent a secondary request. In other examples, a "no" (or any other suitable value indicating that a provider subsystem 108 is a non-subscriber) in the "Subscriber" field would result in that provider subsystem 108 not receiving any secondary requests. A secondary request may be sent to the provider subsystem 108 that originated the response selected at block 330, even if that provider subsystem 108 is a non-subscriber. In such examples, the secondary request does not contain information derived from the other initial responses.

As also shown in Table 1, the repository 120 can include indications, for each provider subsystem 108, of what data to include in secondary requests sent to that provider subsystem 108. The content of each secondary request can be different from secondary requests addressed to other provider subsystems 108. More generally, each secondary request can include a wide variety of data. For example, a secondary request can include the full set of initial response data generated by each other provider subsystem 108. In other examples, a secondary request can include only certain portions of initial response data from other provider subsystems. In further examples, a secondary request can include initial response data for only some of the other provider subsystems 108.

Table 1 illustrates an example of some of the above criteria in connection with the provider subsystem 108-1. The record in the repository 120 corresponding to the provider subsystem 108-1 indicates that secondary requests sent to the provider subsystem 108-1 are to contain only the price from other initial responses, and further that only the price of the least costly competing initial response is to be included.

The data contained in secondary requests can also include a metric derived from initial response data, without including the initial response data itself. For example, the server 112 can generate a score, or any other suitable metric, for each initial response. Such a metric can be derived according to a common mechanism applied to all initial response data, for inclusion in any secondary requests. In other examples, however, distinct metrics can be derived from each initial response 500, for inclusion in distinct secondary requests. Such metrics can be computed based on the initial response data itself, or on the initial response data as well as auxiliary data retrieved by the server 112 from external sources, such as repositories of aircraft properties (e.g. legroom, entertainment equipment and the like), airline (or other type of provider) attributes such as frequency of delays suffered by a given airline, and the like.

For example, Table 1 indicates that secondary requests directed to the provider subsystem 108-2 are to include metrics derived according to a mechanism "M-2" for each initial response 500 from another provider subsystem 108. The mechanism M-2 may be, for example, a metric derivation process developed at the provider subsystem 108-2 itself and deployed to the server 112 for use in generating secondary requests. Table 1 further indicates that secondary requests directed to the provider subsystem 108-3 are to include, for each initial response from another provider subsystem 108, a difference (i.e. a delta) between a metric for that initial response and a metric for the initial response of the provider subsystem 108-3 itself. Further, the above-mentioned metrics are to be derived using a mechanism "M-3" that is distinct from the mechanism M-2 mentioned earlier.

Returning to FIG. 6, in addition to the selection 600 mentioned above, an example performance of block 335 is shown. In particular, following receipt of the selection 600, the server 112 generates and sends three secondary requests 604-1, 604-2 and 604-3, according to the criteria specified in the repository 120. The secondary request 604-1 includes the response identifier "500-1", enabling the provider subsystem 108-1 to associate the secondary request 604-1 with the initial response 500-1. The secondary request 604-1 also includes, as specified in Table 2, the price of the least expensive competing offer. In the present example, the secondary request 604-1 therefore includes the price $830, which is the lowest price among the initial responses 500 (specifically, from the initial response 500-2).

The secondary request 604-2, directed to the provider subsystem 108-2, includes the response identifier "500-2", and two metrics derived according to the mechanism M-2. In particular, the metric with a value of 154 corresponds to the initial response 500-1, and the metric with a value of 130 corresponds to the initial response 500-3. Finally, the secondary request 604-3 directed to the provider subsystem 108-3, includes the response identifier "500-3", and two deltas. The first delta, with a value of 6, indicates the difference between the score of the initial response 500-3 and the initial response 500-1, as derived according to the mechanism M-3. The second delta, with a value of 11, indicates the difference between the score of the initial response 500-3 and the initial response 500-2, as derived according to the mechanism M-3.

As will now be apparent, the repository 120 can include a wide variety of criteria defining, for each provider subsystem 108, what initial response data from other provider subsystems 108 is to be contained in secondary requests. The server 112 can also apply default criteria and/or override criteria when generating secondary requests. For example, an override criterion may specify that certain information, such as the identity of a provider subsystem 108, is to be omitted from any secondary request, regardless of the provider-specific criteria indicated in the repository 120. The secondary requests can also indicate which one of the initial responses represented therein was selected by the client subsystem 104.

The secondary requests can have a variety of formats. For example, when communications between the entities of the system 100 are formatted according to the New Distribution Capability (NDC) standard, the secondary requests can take the form of "OfferPrice" requests, with one or more additional fields (beyond those specified in the NDC standard) to contain initial response data or an indication thereof.

At block 340, the provider subsystem(s) 108 that received secondary requests can generate updated response data, and at block 345 those provider subsystem(s) 108 return the updated response data to the server 112. The generation of updated response data at each provider subsystem 108, as with the generation of initial response data at block 320, can be performed according to any of a wide variety of mechanisms, which need not be consistent among the provider subsystems 108. The generation of updated response data may, for example, be based not only on the request parameters originally received at block 315, but also on the initial response data from other provider subsystems 108 contained in the secondary requests.

Figure 7:
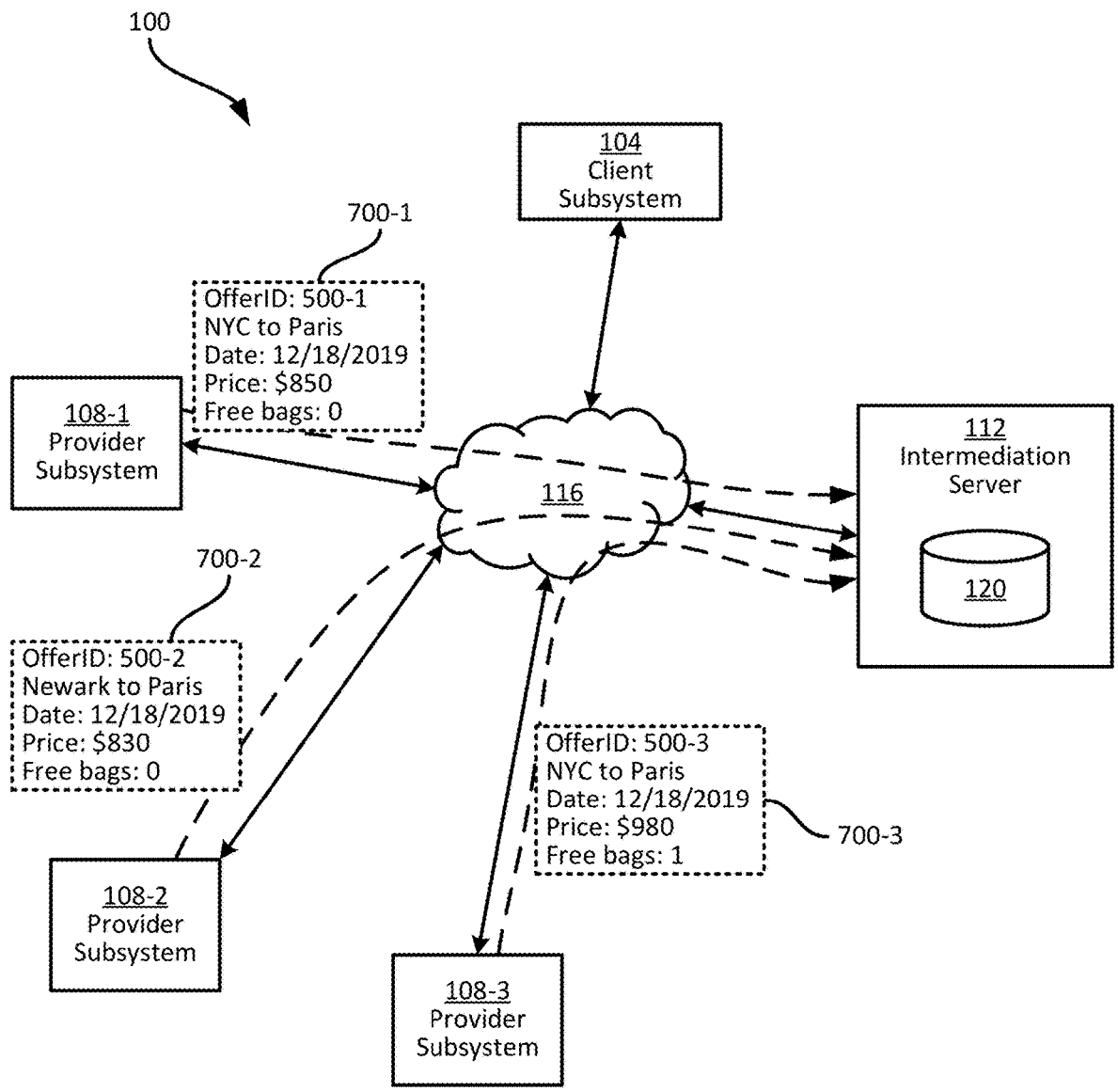
FIG. 7 illustrates an example performance of block 350 of the method of FIG. 3.

FIG. 7 illustrates three example sets of updated response data 700-1, 700-2 and 700-3 sent from the provider subsystems 108 and received at the intermediation server 112 at block 350. The updated response 700-1 includes the previously mentioned response identifier "500-1", as well as information defining a flight from New York to Paris at a reduced price compared to the initial response 500-1 ($850 rather than $950). The updated response 700-2 contains the previously mentioned response identifier "500-2", and otherwise includes no changes to the initial response data. For example, the provider subsystem 108-2 may evaluate its own initial response data (contained in the initial response 500-2), for example according to the scoring mechanism M-2, and determine that the initial response 500-2 scored higher than the values indicated in the secondary request 700-2.

The updated response 700-3 includes the previously mentioned response identifier "500-3" and information defining a flight from New York to Paris at an increased price compared to the initial response 500-3. In other words, the logic applied at each provider subsystem 108 to update (e.g. to "improve") response data compared to the initial response data need not conform to a consistent definition of "improved". The provider subsystem 108-3, for example, may be operated by an airline that seeks to present a premium brand, and reducing prices compared to competing airlines may therefore not be desirable for that airline.

Returning to FIG. 3, at block 355 the server 112 determines whether to implement an additional stage of response generation. As will be apparent from the discussion above, the process up until block 350 implements two stages (generation of initial responses 500, and generation of updated responses 700). The server 112 can implement additional stages, in which the most recent response data is transmitted to the provider subsystems 108 according to the criteria set out in the repository 120.

The determination at block 355 can include a determination of whether a predetermined number of stages have already been reached. For example, the server 112 can store a configurable threshold (e.g. four stages), and can track a current number of stages implemented for a given request received at block 305. When the current number of stages reaches the threshold, the determination at block 355 is negative, and otherwise the determination at block 355 is affirmative. In other examples, the determination at block 355 can be negative when each updated response (e.g. the updated responses 700) is unchanged from the previous response (e.g. the initial responses 500), and affirmative otherwise. That is, the server 112 can continue to implement additional stages until none of the response data received from the provider subsystems 108 changes.

In other examples a combination of the above criteria can be employed at block 355. For example, the server 112 can make an affirmative determination at block 355 when a threshold number of stages has not yet been reached and when updated response data continues to show changes from the previous stage. The server 112 can make a negative determination when either the threshold is reached, or no further changes appear in updated response data (whichever occurs first).

When the determination at block 355 is affirmative, the performances of blocks 335, 340, 345 and 350 are repeated. For example, the server 112 can generate and send further secondary requests to the provider subsystems 108, containing indications of the updated response data 700 discussed above, and the provider subsystems 108 can generated further updated response data. When the determination at block 355 is negative, at block 360 the server 112 returns the final updated response data to the client subsystem 104 for presentation and further selection.

Figure 8:
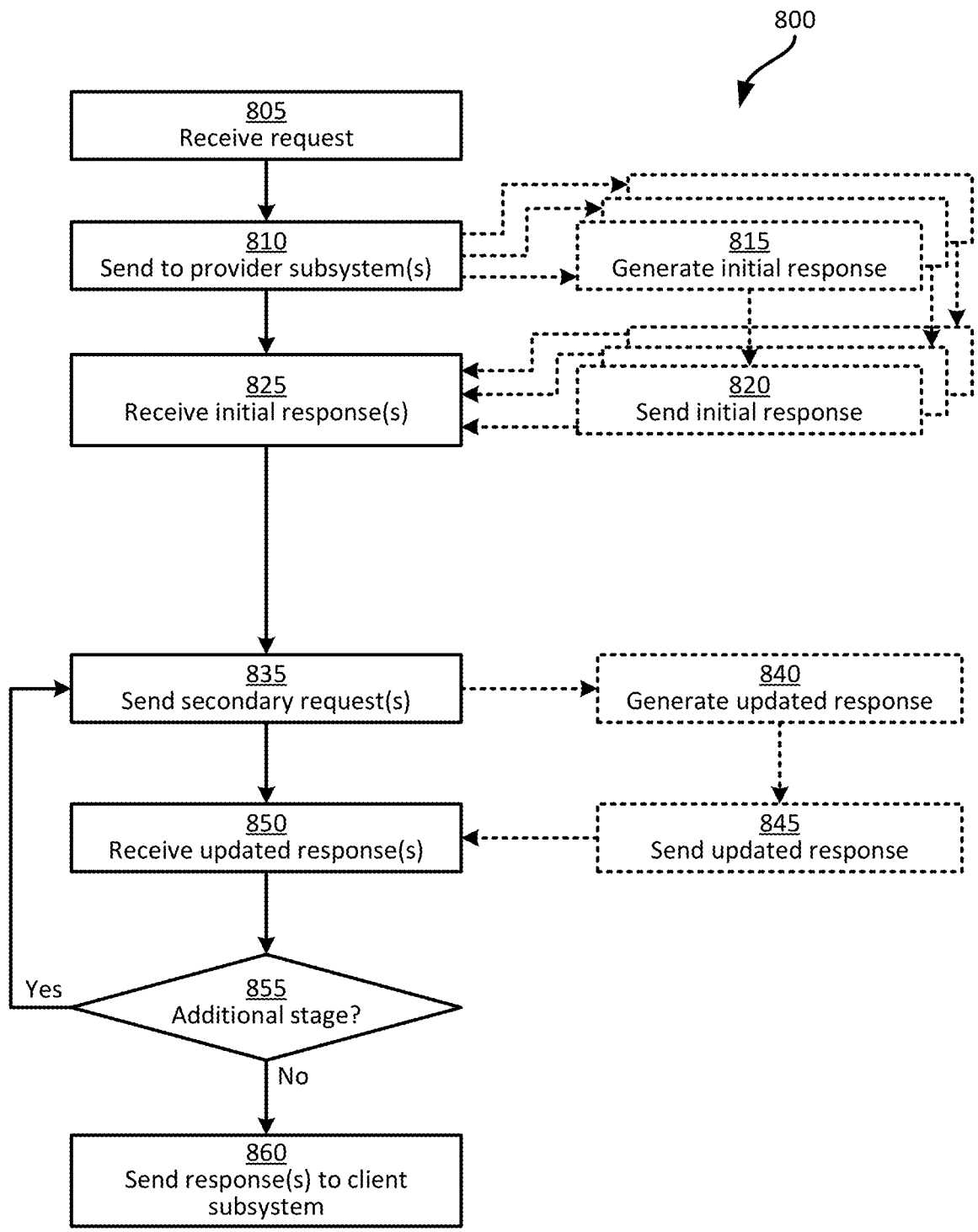
FIG. 8 depicts another method of multi-stage generation of responses to data requests.

Other implementations of multi-stage response generation are also contemplated. Turning to FIG. 8, a method 800 is shown of another example implementation. Blocks 805, 810, 815 and 820 of the method 800 are as described above in connection with blocks 305, 310, 315 and 320 of the method 300, respectively. At block 825, rather than receiving initial responses and sending the initial responses to the client subsystem 104 as at block 325, the server 112 receives the initial responses, but does not yet send responses to the client subsystem 104. Instead, the server proceeds to block 835. The method 800 does not contain an analogue of block 330.

Blocks 835, 840, 845, 850 and 855 are as described above in connection with blocks 335, 340, 345, 350 and 355 of the method 300. However, at block 860, the server 112 sends any responses collected via the multiple stages implemented via blocks 835-850. The response returned to the client subsystem 104 at block 860 may therefore include initial responses from some provider subsystems 108 (e.g. non-subscribers to the multi-stage process), as well as updated responses for other provider subsystems.

The secondary requests, in the example shown in FIG. 8, can have a format distinct from the format employed for secondary requests in the method 300. For example, when communications between the entities of the system 100 are formatted according to the New Distribution Capability (NDC) standard, the secondary requests sent at block 835 can take the form of "AirShopping" requests, with one or more additional fields (beyond those specified in the NDC standard) to contain initial response data or an indication thereof.

The methods and systems described above, by relying on the intermediation server 112 to implement the multi-stage response generation process rather than the provider subsystems 108 interacting directly, may reduce the computational and communications burden on the provider subsystems 108. Employing indications of response data such as the above-mentioned metrics may further reduce at least network load, by compressing the response data exchanged between the server 112 and the provider subsystems 108 in secondary requests.

In addition, the process as implemented via the method 300 may further reduce the computational and communications load of the multi-stage process by waiting until an initial response is selected by the client subsystem 104 to implement second and subsequent stages. Many requests from the client subsystem 104 may not result in any selection, and thus waiting until a selection has occurred before initiating further stages of response generation may reduce the computational burden of such further stages.

Further variations to the above are contemplated. In some examples, the initial responses can be retrieved from a cache at the intermediation server 112, rather than directly from the provider subsystems 108.

Those skilled in the art will appreciate that in some embodiments, the functionality of the application 212 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method, comprising:
receiving, at an intermediation server, a data request including a set of request parameters;
obtaining, at the intermediation server, respective initial responses based on the request parameters, the initial responses corresponding to respective independent ones of a plurality of provider subsystems, wherein each initial response contains a set of initial response data corresponding to the request parameters;
prior to responding to the data request, sending, from the intermediation server to at least a selected one of the plurality of provider subsystems, a secondary request for updated response data, the secondary request including an indication of at least one of the sets of initial response data from one of the provider subsystems distinct from the selected provider subsystem;
receiving from the selected provider subsystem, in response to the secondary request, the updated response data; and
transmitting the updated response data in response to the data request.

2. The method of claim 1, wherein obtaining the respective initial responses includes retrieving the initial responses from a cache.

3. The method of claim 2, wherein the secondary request is formatted as an AirShopping request according to the New Distribution Capability (NDC) standard.

4. The method of claim 1, wherein transmitting the updated response data includes:
transmitting the updated response data and a portion of the initial response data to a client subsystem.

5. The method of claim 4, further comprising:
receiving, at the intermediation server from the client subsystem, a selection of at least one of the updated response data and the portion of the initial response data.

6. The method of claim 5, wherein the secondary request is formatted as an OfferPrice request according to the New Distribution Capability (NDC) standard.

7. The method of claim 1, further comprising, prior to sending the secondary request:
selecting the at least one of the provider subsystems at the intermediation server from a subscriber repository.

8. The method of claim 1, wherein the indication in the secondary request includes the set of initial response data.

9. The method of claim 1, wherein the indication in the secondary request includes a metric derived from the set of initial response data.

10. The method of claim 9, further comprising, prior to sending the secondary request:
generating the metric at the intermediation server based on the set of initial response data and a generation mechanism stored at the intermediation server.

11. An intermediation server, comprising:
a communications interface; and
a processor connected with the communications interface, the processor configured to:
receive a data request including a set of request parameters;
obtain respective initial responses based on the request parameters, the initial responses corresponding to respective independent ones of a plurality of provider subsystems, wherein each initial response contains a set of initial response data corresponding to the request parameters;
prior to responding to the data request, send, to at least a selected one of the plurality of provider subsystems, a secondary request for updated response data, the secondary request including an indication of at least one of the sets of initial response data from one of the provider subsystems distinct from the selected provider subsystem;
receive from the selected provider subsystem, in response to the secondary request, the updated response data; and
transmit the updated response data in response to the data request.

12. The intermediation server of claim 11, wherein the processor is configured to obtain the respective initial responses by retrieving the initial responses from a cache.

13. The intermediation server of claim 12, wherein the secondary request is formatted as an AirShopping request according to the New Distribution Capability (NDC) standard.

14. The intermediation server of claim 11, wherein wherein the processor is configured to transmit the updated response data by:
transmitting the updated response data and a portion of the initial response data to a client subsystem.

15. The intermediation server of claim 14, wherein the processor is further configured to:
receive, at the intermediation server from the client subsystem, a selection of at least one of the updated response data and the portion of the initial response data.

16. The intermediation server of claim 15, wherein the secondary request is formatted as an OfferPrice request according to the New Distribution Capability (NDC) standard.

17. The intermediation server of claim 11, wherein the processor is further configured, prior to sending the secondary request, to:
select the at least one of the provider subsystems at the intermediation server from a subscriber repository.

18. The intermediation server of claim 11, wherein the indication in the secondary request includes the set of initial response data.

19. The intermediation server of claim 11, wherein the indication in the secondary request includes a metric derived from the set of initial response data.

20. The intermediation server of claim 19, wherein the processor is further configured, prior to sending the secondary request, to:
generate the metric at the intermediation server based on the set of initial response data and a generation mechanism stored at the intermediation server.

* * * * *